United States Patent Office.

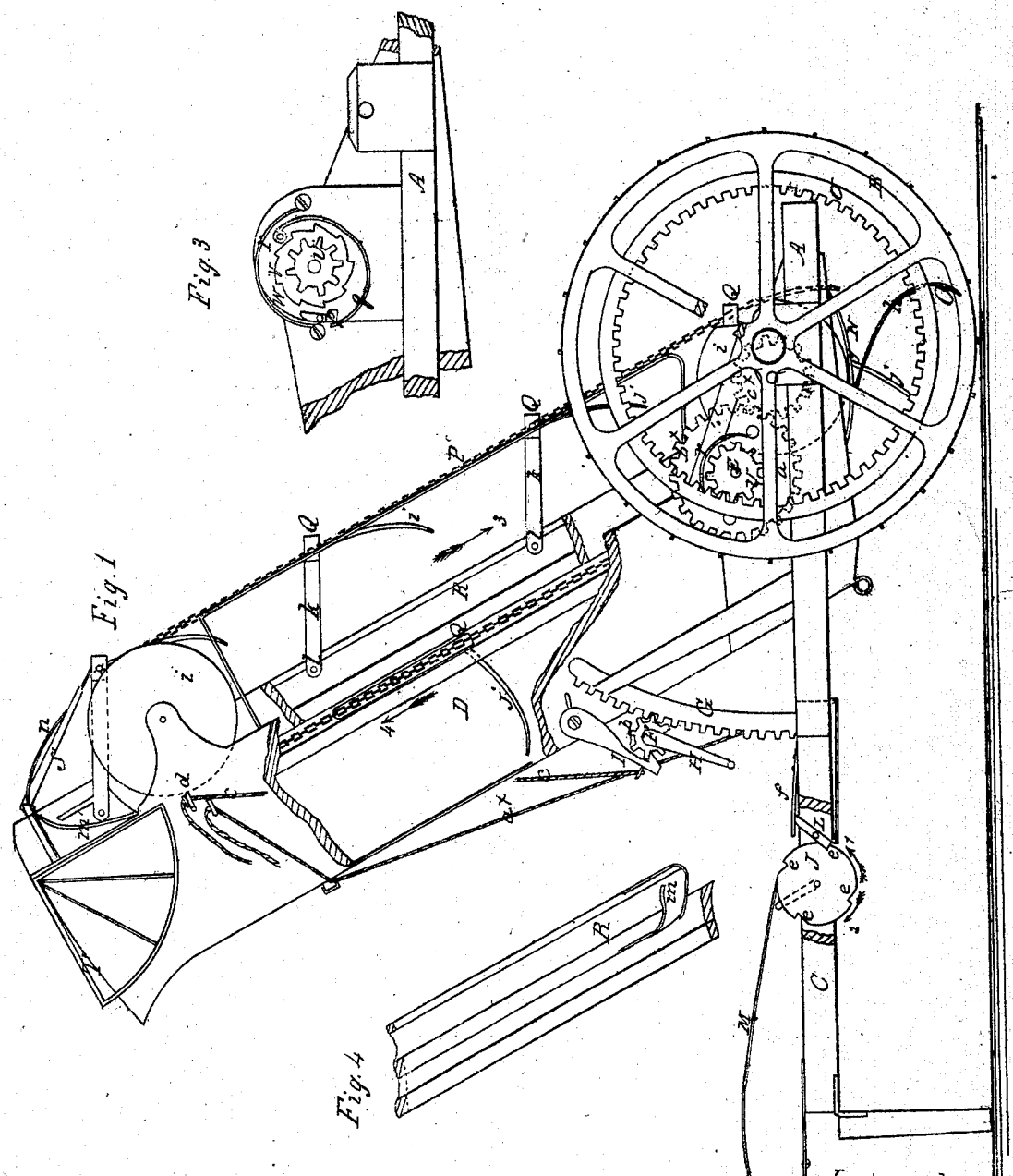

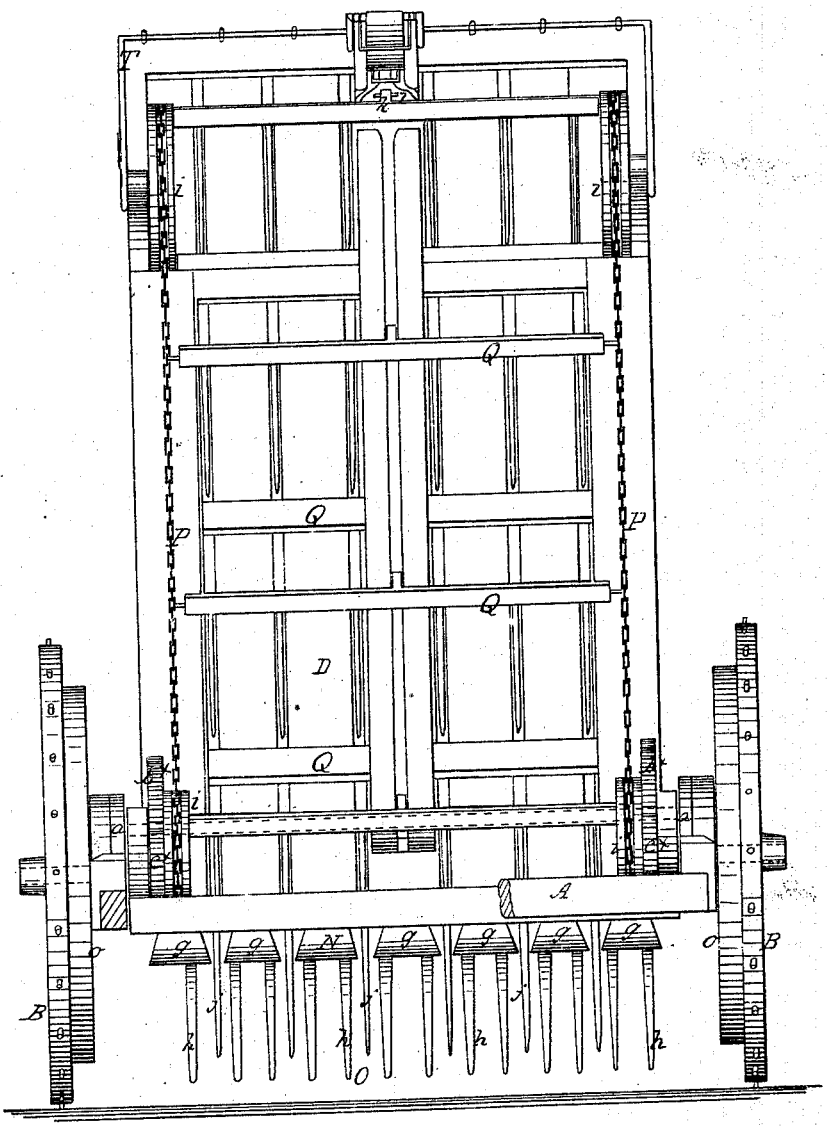

M. S. RAWSON, OF WINHALL, VERMONT, AND C. B. RAWSON, OF SOUTH LONDONDERRY, VERMONT.

*Letters Patent No. 62,224, dated February 19, 1867.*

IMPROVEMENT IN MACHINES FOR RAKING AND LOADING HAY.

*The Schedule referred to in these Letters Patent and making part of the same.*

TO ALL WHOM IT MAY CONCERN:

Be it known that we, M. S. RAWSON, of Winhall, in the county of Bennington, and State of Vermont, and C. B RAWSON, of South Londonderry, in the county of Windham, and State of Vermont, have invented a new and improved Machine for Raking and Loading Hay; and we do hereby declare that the following is a full, clear, and exact description thereof, which will enable others skilled in the art to make and use the same, reference being had to the accompanying drawings, forming part of this specification, in which—

Figure 1 is a side view of our invention, with a portion of the same broken away in order to show some of the working parts.

Figure 2 is a rear view of the same.

Figure 3 is an enlarged side view of a portion of the same.

Figure 4, a longitudinal section of a portion of a guide tube pertaining to the same.

Similar letters of reference indicate like parts.

This invention relates to a new and improved machine for loading hay on wagons while the latter are drawn over the field.

The invention consists of a series of rakes attached to endless chains, and used in connection with a guide box, a rake, and a grating or a shield, all constructed and arranged as hereinafter fully shown and described, whereby the hay may be raked up from windrows and elevated upon the wagon or cart to which the device is attached.

A represents a rectangular frame, which is mounted on two wheels B B, and has a draught-pole, C, attached; and D is a rectangular box, the lower part of which is hung on a shaft, E, the latter having its bearings $a\ a$ on the frame A. This box D may be constructed with wooden sides, a sheet-metal bottom, and a top formed of wooden slats, the spaces between the slats being sufficiently wide to allow rake-teeth, hereinafter described, to pass through. This box D may be raised and lowered, and secured at any desired angle of inclination, by means of pinions $b\ b$, on a shaft, F, gearing into racks G G attached to the front end of the frame A, one at each side, the shaft F having its bearings at the front side of the box D, and one end of said shaft having a crank, H, upon it for the convenience of turning it. The shaft F is prevented from casually turning by means of a pawl, I, attached to one side of the box D, and engaging with one of the pinions $b$. This holding of the shaft F, or the preventing of it from turning, admits of the box D being retained at any desired point within the scope of its adjustment, and said pawl I has a cord, $c$, attached to it, which passes through a guide, $d$, at one side of the upper part of the box D, and is within convenient reach of the person on the wagon or cart being loaded. The draught-pole C has a slot or mortise made vertically through it, and in this slot or mortise a pulley, J, is fitted, the axis of the pulley at one end extending through the side of the draught-pole, and having a crank upon it by which the pulley is turned when necessary. The pulley J has a series of notches, $e$, made in it, to receive a pawl, L, which is fitted in the mortise in the draught-pole at the rear of the pulley J, and has a spring, $f$, bearing upon it to keep it engaged with the pulley so that the latter will be prevented from turning in the direction indicated by arrow 1, (see fig. 1.) M is a rope, one end of which is attached to the front end of the draught-pole, and the other end connected to the periphery of the pulley J by a hook on the rope catching over a pin in the periphery of the pulley. The draught-pole C is attached to the rear of the wagon to be loaded by having the rope M pass around a pulley attached to the hind axle of the wagon, and fitting the hook or eye at the ends of the rope on the pin on pulley J, the latter being then turned, through the medium of the crank, in the direction indicated by the arrow 2, and the draught-pole C thereby drawn close up to the axle of the wagon to be loaded, the connection being made sure by the pawl L, as it prevents the pulley from turning in the direction of arrow 1, and consequently the rope M cannot be unwound from said pulley under the draught movement of the machine. To the lower end of the box D there is attached a grating or shield, N, which is composed of a series of metal bars or strips, $g$, curved so that their upper surfaces will be concave, and placed at such a distance apart that the rake-teeth may pass down between them, the grating shield or extending out from the rear of the lower end of the box D. To the under side of the bars or strips $g$ of the grating or shield N, teeth $h$ are attached, which form a rake, O, the teeth $h$ being curved similar to those of an ordinary wire tooth horserake, (see fig. 1.) To the box D, at its upper or rear side, there are secured pulleys $i$, over which endless chains P pass. These chains have rake-heads Q attached to them at equal distances apart, and each rake-head has a series of teeth, $j$, secured to it. The heads Q have also a bar, $k$, framed centrally into them, and these bars project from the rake-heads at nearly right angles with the teeth. Each bar $k$ has a pin, $l$, passing through it near its outer end at right angles. On the upper or rear side of the box D there is firmly secured a guide tube, R, which is of rectangular form in its transverse section, and has its upper surface slotted longitudinally to allow the outer parts of the bars $k$ to pass through, the pins $l$ being underneath the top of the tube when the rakes are passing down, as indicated by the arrow 3. At the lower end of the tube R there is a spring, $m$, which yields to allow the pins $l$ to pass it and prevent them from returning, causing the pins, as the rake-heads pass around the lower pulleys, $i$, to pass underneath the tube R, so that the bars $k$ as the rakes move upward in the direction indicated by arrow 4, may move up underneath the tube R while the teeth $j$ pass upward through the box D. The teeth $j$, as the rake-heads Q pass around the lower pulleys $i$, pass down between the bars or strips $g$, and gather up the hay or take it from the rake O, the teeth $j$ being kept in position by the bars $k$ underneath tube R. As the rake-heads Q pass up and around the upper pulleys $i$, the teeth $j$ are drawn out from the hay nearly at right angles, the mass of hay in box D being shoved out from the top of the same upon the load by the continuous action of the rakes, and as the rakes reach the upper part of the box D, the bars $k$ pass up a spring-plate, $m'$, which enables the pins $l$ to pass into the upper end of the tube R, said spring-plate serving as a guide for the bars $k$ and pins $l$. Directly over the spring-plate $m'$, there is a hinged flap, S, which has a spring, $n$, bearing upon it, and which keeps the bars $k$ in proper position while the heads Q are passing around the upper pulleys $i$, guiding or directing the pins $l$ and outer ends of the bars $k$ into the upper end of the tube R. At the upper end of the box D there is a flap, T, suspended from the top edge of the box in such a manner that it may swing freely, and allow the hay to pass readily out from the top end of D. The endless chains P are operated or wound from the wheels B B, the latter having concentric toothed rims $o$ $o$ at their inner sides, which gear into pinions U placed loosely on the ends of the shaft E on which the box D is hung. Ratchets V are also placed loosely on this shaft and are connected to the pinions U, and circular plates W are firmly keyed on said shaft and have pawls $p$ attached, which engage with the ratchets V and form a connection between the pinions U and the shaft E, the pawls $p$ being kept engaged with the ratchets V by springs $q$, (see fig. 3.) On shaft E there are permanently secured two toothed wheels $b^\times b^\times$, which gear into similar wheels $c^\times$ on the lower pulleys $i$. Over the ratchets V there are secured semicircular plates $r$, which, when the box D is lowered, strike or come in contact with the upper ends of the pawls $p$, and throw said pawls out from the ratchets V. Hence when the box D is lowered and the device not in operation, the rakes which elevate the hay are inoperative, and the teeth $h$ of the rake O are elevated above the surface of the ground. When the box D is elevated to a working position, the plates $r$ are raised above the pawls $p$, and the springs $q$ throw the pawls in contact with the ratchets V so as to render the hay-elevating rakes operative. When the wagon or cart to which the invention is applied is loaded, the attendant on the load, by pulling a cord, $a^\times$, attached to pawl L, may release the pulley J, and thereby detach the device from the cart or wagon. It will be seen that the hay in being elevated upon the load cannot be blown about by the wind, but will be lodged upon the load in a compact manner.

Having thus described our invention, we claim as new, and desire to secure by Letters Patent, is—

1. The combination and arrangement of the pinions $b$, racks G, pawl I, and box D, in the manner as and for the purpose specified.

2. The notched pulley J fitted in the draught-pole C, in combination with the rope M, and pawl L, all arranged and applied substantially as and for the purpose specified.

3. The rake-heads Q, attached to the endless chains P P, and provided with the bars $k$, having pins $l$ passing transversely through their ends, in combination with the guide tube R and box D, in which the teeth $j$ of the rake-heads Q work in the passage of the rakes upward, as shown and described.

4. The spring $m$ $m'$ at the upper and lower ends of the guide tube R, in combination with the flap S, having the spring $n$ bearing upon it, substantially as and for the purpose set forth.

5. The combination and arrangement of the box D, shield N, teeth $h$, in the manner as and for the purpose specified.

M. S. RAWSON,
C. B. RAWSON.

Witnesses:
   SIDNEY S. HILL,
   J. L. PETTIBONE.